Figure 1:
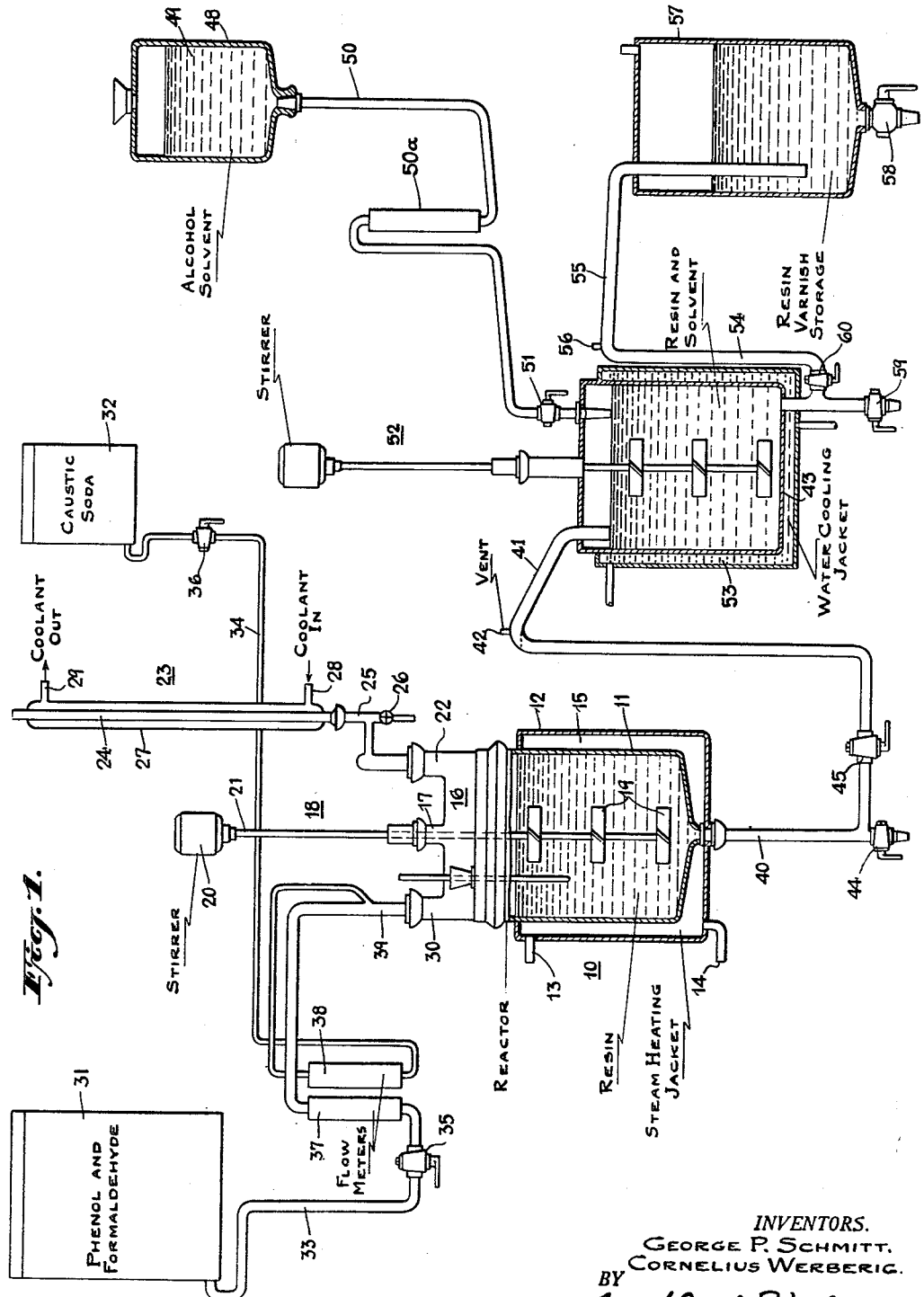

Sept. 7, 1954 G. P. SCHMITT ET AL 2,688,606
CONTINUOUS METHOD FOR PRODUCING THERMOSETTING
PHENOL-ALDEHYDE RESINS
Filed Oct. 20, 1951 2 Sheets-Sheet 1

INVENTORS.
GEORGE P. SCHMITT.
CORNELIUS WERBERIG.
BY
Ward Crosby & Neal.
ATTORNEYS.

INVENTORS.
GEORGE P. SCHMITT.
CORNELIUS WERBERIG.
BY
*Ward Crosby & Neal*
ATTORNEYS.

Patented Sept. 7, 1954

2,688,606

UNITED STATES PATENT OFFICE 2,688,606

CONTINUOUS METHOD FOR PRODUCING THERMOSETTING PHENOL - ALDEHYDE RESINS

George P. Schmitt and Cornelius Werberig, Trenton, N. J., assignors to St. Regis Paper Company, New York, N. Y., a corporation of New York Application October 20, 1951, Serial No. 252,368

5 Claims. (Cl. 260—57)

This invention pertains to improvements in methods and apparatus for effecting polymerization of polymerizable raw materials as a continuous and uninterrupted operation and to the polymerized products so produced; and pertains more especially to the application of said process and apparatus to the production of synthetic resin polymers and to the resinous polymers so produced.

The invention provides a process and apparatus employing a single stage, continuous flow, stirred-tank reactor, of general application in the polymerization of polymerizable raw materials, and of particular application in the production of synthetic resinous polymers, such, for example, as in the production of phenolic resins from phenols and aldehydes, continuously reacted in the presence of suitable catalysts, accompanied by continuous introduction of unreacted raw materials and continuous withdrawal of the reaction product.

Heretofore, the polymerization of resin forming materials has in general been carried out as a batch type operation, in which the reaction constituent or constituents, are charged into a kettle, autoclave or the like, and subjected to the appropriate reaction conditions, heat, pressure, temperature, etc., until the reaction has advanced to the stage desired, whereupon the entire reaction charge is dumped, and a new charge of raw materials introduced for reacting the next batch.

Attention has more recently been directed to the development of methods and apparatus for the production of synthetic resinous materials as a continuous and uninterrupted operation, but those developed to date have proved extremely cumbersome and difficult to apply and stabilize on a commercial scale, by reason of the many variables involved, which are entirely eliminated by the extremely simple process and apparatus of this invention.

In general, all continuous chemical processes in commercial operation are carried out in one of two types of equipment, the tubular reactor or the continuous flow, multistage stirred-tank reactor. In the tubular type of reactor, the raw materials are mixed thoroughly and then fed, without stirring, through a long tube in which the reaction progresses. In order for this type of reactor to produce material of uniform quality, there must be a balance between the rate at which the reaction proceeds and the rate at which the material flows through the tube. This results in a situation in which the extent of conversion at any point along the tube must remain constant all during the continuous operation. For this reason, the tubular reactor has been characterized as "temporally-invariant, spacially-variant," since there is no change in the reactor with time but only with distance along the tube.

The continuous flow, stirred-tank reactor, which has been brought to its present state of development by Denbigh (Trans. Far. Soc., 1944, vol. 40, p. 352 etc. and 1947, vol. 43, p. 648 etc.) is most simply described as a stirred tank into which raw materials are continuously fed and from which products are continuously drawn off. Both theoretically and in practice it can be shown that the product issuing from the tank and the material reacting within it are identical with each other and remain constant in quality as long as the rates of flow in and out and the level in the tank are maintained without change. Here the stability is much greater than in the tubular reactor. For example, if the equilibrium condition is disturbed momentarily for any reason, the system will not only minimize the immediate change by the damping effect of the large stirred reaction mass, but the original equilibrium will ultimately be attained again. Because the contents of the reactor are constant at all points in it at all times after equilibrium is established, the continuous flow, stirred-tank reactor is described as "spacially-invariant, temporally-invariant."

In all continuous operations, control is an important factor. For the manufacture of thermosetting resins, however, it is especially acute, because the material being manufactured may convert to a solid mass if proper control is not maintained. The continuous process developed by I. G. Farbenindustrie for producing thermosetting phenolic resins, employs the tubular type of reactor. The report describing this process (O. T. S., Spec. Tech. Report PBI 7555 No. 5722) warns of the dangers involved: "—and if the reaction gets out of hand" it "produces solid Bakelite with the hardness of rock". And again "The heat must be effectively transferred, since otherwise the reaction gets out of hand and rockhard Bakelite is produced." To achieve even this precarious stability, the I. G. process requires four separately controlled heat zones and three different pH zones, one alkaline, one acid, and the third alkaline again. It is, therefore, not surprising that the use of this process is not more widespread. Another tubular type of continuous process has been developed by E.

Sutherland of Sherwood Paints Ltd. in England (see Abstracts, Symposium on Polymer Chemistry, Sec. Chem. Ind. London, Eng. Sept. 21-23, 1950). In this process the mixed reactants flow in a thin film down a heated, packed column up which an inert gas is passed to remove volatiles. Control in this process is excellent, but, considering the investment, the output is small for any but the more expensive products such as alkyd resins.

The continuous flow, stirred-tank reactor type of reactor system has only recently come into employment as a commercial production technique, and only as embodied in the multi-stage modifications employing a plurality of such reactors operating in tandem. Partly this is because the complex procedure required for starting up and shutting down continuous operations has only recently been elucidated for the multi-stage set-ups employing a plurality of tank reactors in tandem, to which this type of reactor has to date been restricted. In addition it has been found extremely difficult to establish and maintain stability of operation in such multi-stage systems, which are somewhat analogous to the tubular reactor system in this respect.

While a number of articles have been published pertaining to systems of the above type, it has not previously been recognized that a single stage, continuous flow, stirred tank reactor can be adapted to commercial operations. In fact, the consensus of published information, to quote Denbigh is that "The single compartment (stage) C. F. S. T. R. is therefore very unsuitable for use as an industrial reaction vessel." We have discovered, however, in accordance with our invention, that under a special set of conditions, as set forth below, the general opinion is incorrect, and that the single compartment reactor can be adapted industrially to polymerization processes.

There has been prejudice against the continuous flow, stirred tank type of reactor because some of the material inevitably gets "short circuited" or by-passed directly to the product outlet without reaction. However, this situation is no different than in any batch reaction, which, because it is carried to less than 100% completion, also contains unreacted raw materials in the end product.

A second reason why, according to Denbigh, a one-stage reactor cannot be employed industrially, is that the time required to achieve a practical yield is ten to twenty times as long as in a batch process or tubular continuous process. In direct contradiction to this, our investigations have established that in a period equal to a batch reflux time in the production of a phenolic resin varnish, for example, the one-stage reactor will produce an equal amount of varnish at substantially the same yield. And because, under continuous operations, it is not necessary to have a charge period, a distillation period, and a mixing and discharge period, for each kettle full of varnish produced, enough more time is saved to bring up the output of a one-stage, continuous flow, stirred-tank reactor to two to three times in batch output, for any given size of reaction vessel.

Figure 2:
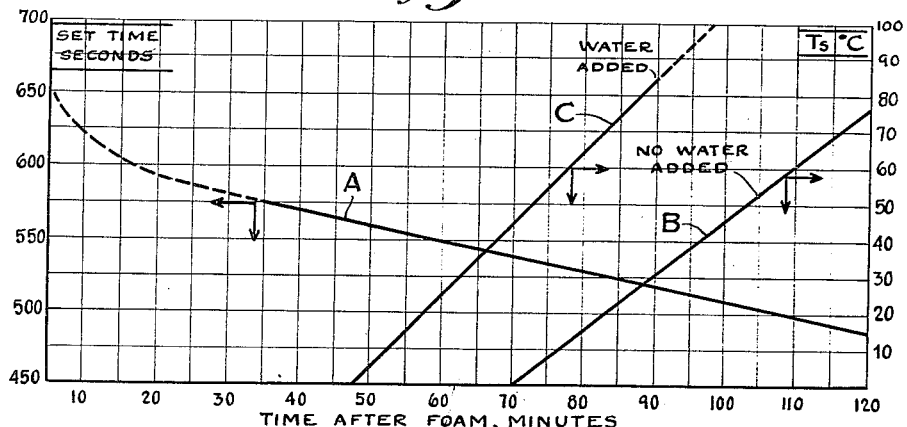
Figure 3:
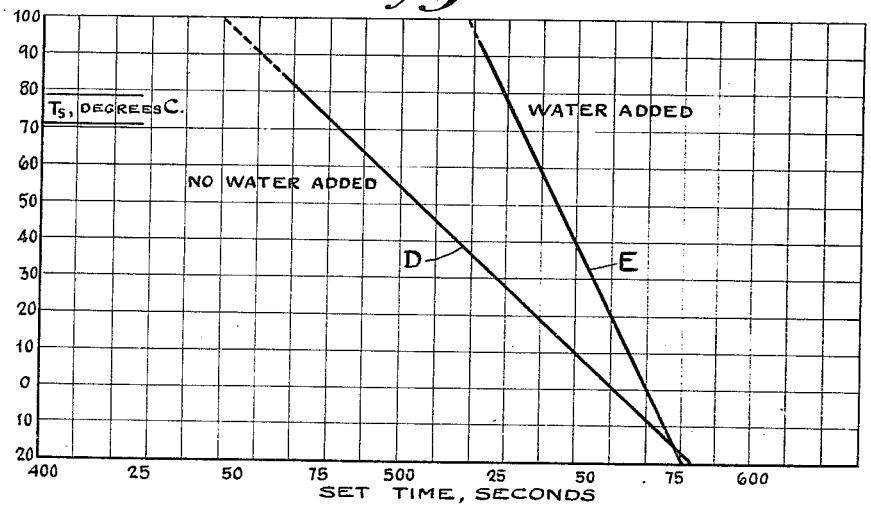
Figure 4:
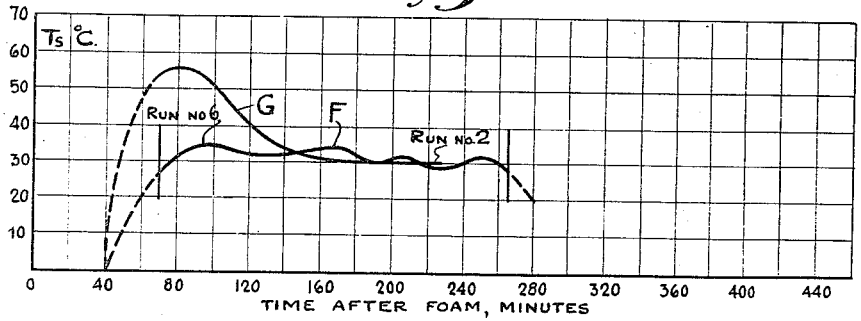

Referring now to the accompanying drawings for a description of the invention, Figure 1 illustrates diagrammatically an apparatus in accordance with the invention for practising the process thereof in the production of a synthetic resin and varnish thereof. The drawing specifically illustrates the invention as applied to the production of a thermosetting phenol-formaldehyde resin and resin varnish, the latter as suitable for laminating purposes. Figures 2 to 4, inclusive, are graphs illustrative of certain details of the invention as explained below.

Referring to Figure 1, the single stage continuous flow stirred-tank reacting vessel is shown generally at 10, and comprises a reaction tank 11 surrounded by a steam jacket 12 having inlet and outlet ports 13, 14, for the introduction and flow of steam into and through the space 15 between the reaction vessel 11 and the jacket 12. The reaction vessel is provided with a three-neck cover or closure 16, the central neck 17 of which is fitted with a stirrer 18 provided with stirring blades 19 within the tank and driven by a motor 20 attached to the shaft 21 of the stirrer.

Neck 22 of the reactor tank cover, has fitted thereto a refluxing condenser 23 comprising an inner tube 24 open to the atmosphere at its upper end, with its lower end connected to the neck 22 through a T-tube 25 the lower leg of which is provided with a petcock 26 to permit of discharging a portion or all of the condensate, if desired. The inner tube 24 is jacketed as at 27 for the introduction and flow of a condensing coolant between inlet and outlet connections 28, 29.

The reactants are introduced into the reaction vessel 10 through the third neck 30 from reservoirs or tanks, as at 31 and 32, the former containing a weighed supply of phenol and formaldehyde, in appropriate ratio, as noted below, and the latter containing a catalyst, such as caustic soda. The reactants are conducted from the tanks 31, 32 over pipe lines, as at 33, 34, provided with petcocks, as at 35, 36, these pipe lines extending through flow meters, as at 37, 38, and converging thence into a single pipe, as at 39, fitted to the neck 30.

The reaction vessel 10 is provided at its base with an outlet conduit 40 of U tube configuration which extends downwardly from the reaction vessel 10 and thence upwardly to an overflow section 41, vented to atmosphere, as at 42, the overflow section extending downwardly into a tank 43 in which the resin is admixed with a solvent for producing a laminating varnish. Conduit 40 is provided with a discharge petcock 44 for withdrawing samples from the reaction vessel 10 or for emptying the same; and conduit 40 is also provided with a shutoff petcock 45 for shutting off the flow to tank 43.

For producing a resin varnish as a continuous operation, an elevated tank 48 containing a liquid carrier or solvent 49 for the resin, such as alcohol, has extending downwardly from its base, a discharge conduit 50 which discharges through a flowmeter 50a into tank 43, through a shutoff petcock 51. For admixing the resin and solvent constituents concurrently flowing into tank 43, the latter is provided with a motor driven stirrer 52, similar to stirrer 18. Tank 43 is provided with a water cooling jacket, as shown generally at 53, for maintaining the resin and solvent admixture at an appropriate temperature. An outlet conduit 54 of U tube configuration, extends downwardly from the base of tank 43 and thence upwardly to an overflow section 55 vented to atmosphere, as at 56, the overflow section sloping downwardly to and discharging into a resin varnish storage tank 57, provided at its base with a discharge petcock 58. The outlet pipe 54 is provided with a discharge petcock 59 for tank 43, and also with a shutoff petcock 60 for shutting off the flow to tank 57.

In starting up the apparatus of Figure 1, in the production of a phenolic resin for example, one procedure that may be followed is first to charge the reactor 10 with the same raw materials that will subsequently be charged continuously, and in the same relative proportions, the petcocks 35, 36 and 45 being meantime turned off, to prevent any flow of materials through the reactor. Heat is now applied by the introduction of steam into the jacket space 15, and the charge is brought to "foam" and refluxed batchwise for about two-thirds the hold-up time of continuous operation. For example, if the hold-time is to be sixty minutes, the reactor is charged with the amount of raw materials which would flow into the reactor during a sixty minute interval, and the reactants are refluxed for about forty minutes. During this forty minute refluxing interval, an amount of water is distilled off, equal to the amount that would ordinarily be distilled off during sixty minutes of continuous flow operation. For removing the water as it is thus distilled, the petcock 26 of the refluxing condenser 23 is partially opened. Accordingly at the end of forty minutes of refluxing, the contents of the reactor are in the same condition as would result from an equilibrium state in continuous operations, except for being slightly under-reacted.

At this point, continuous charging and taking off, to and from the reactor tank 10, is initiated, by appropriately opening the petcocks 35, 36 and 45, and the rate of distillation reduced by petcock 26 to the amount calculated for continuous operation. The initial batch-wise refluxed resin output, is usable, being only about thirty to forty seconds higher in set time, the latter as defined below, than that produced after the establishment of equilibrium in continuous flow operations, which occurs about forty to one hundred minutes after initiation of the continuous flow operations.

Shut down of operations is accomplished merely by closing the petcock feeds 35, 36 and 45, and cutting the resin content in the reactor 10 with the same proportion of liquid carrier or solvent, for example alcohol, as is used to cut the resin charged continuously from the reactor 10 to the resin and solvent mixing tank 43. The resin varnish made in this way is of course identical with that produced in tank 43 during continuous operations.

In order to determine, from time to time, how the continuous flow reaction is progressing, it is necessary to have available a simple and rapid method of testing a sample of the reaction product, to determine its set time. The present invention provides a test of this character, referred to herein as the "cloud temperature" or "cloud point," which has proved extremely effective in controlling the continuous flow resin and resin varnish production.

Set time tests determine the length of time required to attain the gel point or rubbery point in the cure of a phenolic resin. A sample of 2 to 3 grams of an approximately 50% solution of the phenolic resin in alcohol (normally called varnish) is placed in a test tube of about .75 inch in diameter and 6 inches in length. This test tube is immersed to within a ½ inch of the top in an oil bath maintained at the temperature of 135° C. Into the test tube is inserted a glass stirring rod attached to a motor driven stirrer turning at about 300 R. P. M. The stirring rod has a rounded end and is about 0.3 to 0.32 inch in diameter for the first 2¼ inches up from the end. For the remainder of the length it is about .25 inch in diameter. Length is not critical except that the stirrer should be long enough so that the motor does not receive too much of the vapor of the boiling resin sample. The rod is thicker at the bottom in order to provide only a fairly narrow annular space between it and the wall of the test tube, and is narrowed down above in order to give adequate volume in case of foaming during the test. To run a test, the varnish sample is weighed into a test tube and tube placed in the bath and then the motor driven stirrer is lowered into the test tube until it rests on the bottom. Time is taken from the instant the tube is placed in the bath. As the resinification progresses the sample becomes increasingly more viscous until the resin gathers itself into a ball at the bottom of the rod and touches only the bottom of the test tube. At the end point, the character of the resin changes from a viscous fluid to a rubbery mass and causes the stirring rod which has hitherto been rotating smoothly to wobble or precess noticeably. The precision of this test is about plus or minus 2% of the set time in seconds.

The cloud temperature test consists in taking a sample of the product from the reaction vessel 10, diluted preferably with an equal amount of water, although the latter is not essential, and determining the temperature at which clouding or precipitation of the reaction product occurs. As shown below this precipitation or clouding temperature is directly related to the set time of the resin.

In carrying out this test, ten grams of the resin reaction product from the reactor 10, Figure 1, is weighed out into a 50 milliliter test tube, and diluted, preferably, with 10 grams of distilled water, and the two ingredients thoroughly mixed. If the mixture is initially clear, it is cooled in an ice bath, with constant stirring with a thermometer until the solution becomes sufficiently cloudy to obscure the thermometer used as the stirring rod. This is taken as the cloud temperature, $T_s$. If the mixture is initially cloudy after mixing, it is heated until clear, and then cooled, as before, until the cloud temperature is reached.

Some resin will require more water than the above described 10 grams, and some will have such a low tolerance for water, that only 5 grams of water can be employed. In every case, however, a cloud point of sufficient sharpness to be of definite utility as a control test in continuous resin or resin varnish manufacture, is obtained.

In order to correlate cloud temperature with set time, in the production of a thermosetting resin varnish, for example, the same formulation that is used for continuous operation in the Figure 1 set-up, is also employed to make a resin batch-wise. Samples of this batch are taken from time to time throughout the reaction, and the set times and cloud points determined. Figure 2 shows graphically the set times versus time, and the cloud point versus time, as recorded for such a run. In Figure 2 Graph A shows the set time in seconds, plotted as the ordinate, against the time after foam in minutes, plotted as the abscissa. Graphs B and C show the corresponding cloud temperatures, Graph B with no water added, and Graph C with an equal amount of water added, plotted against time after foam in minutes as the abscissa and cloud temperatures $T_s$ in degrees centigrade plotted as the ordinate, at the right. From Figure 2 a direct correlation between cloud temperature and set time, may be derived, and plotted as shown in Figure 3, wherein the abscissa represents set times in seconds and the ordinate represents cloud temperatures, $T_s$, in degrees centigrade. In Figure 3, Graphs D and E represent, respectively, cloud temperature versus set time, with no water added, and with water added equal in amount to the resin sample tested.

From Figure 3, by the method of averages (D. S. Davis, "Empirical Equation and Nomography"), two equations were developed, giving the following relation between set time and cloud temperature for a phenolic resin:

I. (no water added) $T_s = 511 - .914$ (S. T.)
II. (water added) $T_s = 1097 - 1.927$ (S. T.)

where $T_s$ is the cloud point in degrees centigrade, and S. T. equals set time in seconds. The first Equation I represents the varnish as taken from the reactor. The coefficient of the second term indicates .914 degree change in cloud temperature for every second change in set time. In the Equation II conditions were chosen corresponding to those used in running the cloud point test on continuously made varnish.

Figure 4 illustrates the rapidity with which uniformity of operations is achieved after switching from the initial batch-wise operation above described, to continuous flow operation. In this figure time after foam point in minutes is plotted as the abscissa, against cloud temperature $T_s$ as the ordinate. In this figure, Graphs F and G represent two runs in each of which the hold-up time was sixty minutes. In run F, the initial batch-wise reaction was forty minutes, and in run G sixty minutes. The latter exhibits the "hump" of over-reacted resin characteristic of too long an initial batch-wise reaction (precook).

The following are illustrative examples as to the production of resin varnishes in accordance with the present invention, employing the method and apparatus thereof:

Example I

Into an apparatus as shown in Figure 1, and comprising a 5-liter, three-necked reaction flask, fitted with condenser, stirrer, inlet for reactants and outlet for product, there was charged 1040 grams phenol, 1266 grams commercial formalin, and 105 grams 10% aqueous NaOH solution. The mixture was refluxed for forty minutes with partial distillate takeoff, so that 411 grams of distillate was collected in this period. At the end of forty minutes, continuous charging of reactants and removal of product was initiated. The rates of charging were 898 g./hr. phenol, 1093 g./hr. commercial formalin, and 90.5 g./hr. of the 10% NaOH solution. The rates of takeoff were 411 g./hr. of distillate, and 1670 g./hr. of resin. Dilution with solvent of the resin product may be carried out continuously or batch-wise, the solvent employed being 88% isopropanol, and being admixed with the resin in the proportion of 12.75 parts by weight of solvent to 100.00 parts by weight of the resin to give a resin varnish suitable for laminating. During the run, the cloud point rose from about 0° C. at initiation of continuous operations to about 45° C. after forty minutes, continuous operation, at which point it remained within plus or minus 6° C.

Laminates made up from the resin varnish of Example I by impregnating kraft paper therewith to a resin content of 41.0% by weight of the total after oven drying to remove volatiles, cutting, stacking, and hot pressing in conventional manner at a pressure of about 1000 p. s. i. and at a temperature of 185° C., showed a flexural strength of 28,100 p. s. i. machine direction and 26,600 cross direction, a water absorption of 2.69%, and were generally suitable for the purposes to which the same formulation made batch-wise could be put.

When diluted with alcohol to a solids content ASTM D115-41 of 51.2%, the resin solution produced, had a set time of 445 seconds, a Brookfield viscosity of 76 cps. and a specific gravity of 1.116. The last two tests were run at 25° C.

Example II

The rates of flow in Example I were maintained, except that the level in the reactor was increased until the average hold-up was about 10% greater than sixty-five minutes as above. Under these conditions the cloud point was about 80° C. and the properties of the final resin solution also indicated an increase in extent of reaction.

Example III

The rates of flow of Example I were maintained except for the 10% sodium hydroxide solution, which was increased to 157.5 g./hr., and the rate of distillation, which was increased to 458 g./hr. Initially the cloud point dropped, due to higher pH, but when equilibrium was established, the cloud point returned to 45° C. ± 6°. The yield is higher and other tests on the solution indicate a greater reaction than Example I.

As above stated, the method and apparatus of the present invention is of general application in the polymerization of polymerizable materials, and is essentially adapted to the polymerization or resinification of resin-producing raw materials. Thus as applied to the production of phenolic resins, the invention is applicable to the production of resins from cresol, coal tar fractions, petroleum fractions, and is also applicable to the production of other thermosetting resins, such as the urea, melamine and alkyd resins in general, as well as others of the poly condensation type. The catalysts employed may be acid, basic, or amine. Also the aldehydic constitutents may comprise formaldehyde and its reversible polymers, acetaldehyde, furfural, and equivalents thereof.

We claim:

1. A continuous process for producing a thermosetting phenolic resin in a single reaction vessel provided with an agitator, which comprises: continuously introducing into said vessel, raw materials consisting of a phenol, an aldehyde, and a catalyst, in relative proportions such as to produce said resin, and at a substantially constant rate of introduction for each said constituent, subjecting the resulting mixture to a polymerizing reaction in said vessel, with constant agitation such as to produce and maintain a substantially homogeneous admixture of reacted and unreacted material throughout said reaction vessel, while continuously withdrawing said substantially homogeneous admixture of material from said vessel at substantially the same rate said raw materials in aggregate are introduced therein, and so adjusting said rate of introduction and withdrawal in relation to the volume of said vessel and the time required for polymerizing said raw materials therein, that the material withdrawn is reacted to a thermosetting state.

2. A continuous process for producing a thermosetting phenolic resin in a single reaction vessel provided with a stirrer, which comprises: continuously introducing into said vessel, raw materials consisting of a phenol, an aldehyde, and a catalyst, in relative proportions such as to produce said resin, and at a substantially constant rate of introduction for each said constituent, subjecting the resulting mixture to a polymerizing reaction in said vessel, by application of heat thereto with refluxing, and while subjecting said mixture to constant stirring such as to produce and maintain a substantially homogeneous admixture of reacted and unreacted material throughout said reaction vessel, continuously withdrawing said substantially homogeneous admixture of material from said vessel at substantially the same rate said raw materials in aggregate are introduced therein, and so adjusting said rate of introduction and withdrawal in relation to the volume of said vessel and the time required for polymerizing said raw materials therein, that the material withdrawn is reacted to a thermosetting state.

3. A process for producing a phenolic resin, which comprises: introducing into a reaction vessel, raw materials consisting of phenol, formalin and 10% sodium hydroxide solution in the proportions by weight of 1040 grams of phenol, 1266 grams of formalin and 105 grams of said sodium hydroxide solution, subjecting the resulting mixture to polymerizing reaction in said vessel by the application of heat thereto with refluxing for forty minutes, with constant agitation with a partial distillate takeoff of 411 grams of distillate within said period, thereafter continuously introducing said constituents into said reaction vessel substantially at the rates of 898, 1093 and 90.5 grams per hour of said phenol, formalin and sodium hydroxide solution, respectively, and with constant agitation such as to produce and maintain a substantially homogeneous admixture of reacted and unreacted material throughout said reaction vessel, while continuously withdrawing said substantially homogeneous admixture of material from said vessel substantially at the rate of 1680 grams per hour, accompanied by a distillate takeoff of substantially 411 grams per hour.

4. A continuous process for producing a thermosetting, phenolic resin coating and impregnating composition, which comprises: continuously introducing at a substantially constant rate into a reaction vessel, raw materials consisting of a phenol, an aldehyde and a catalyst, in relative proportions such as to produce said resin, and at a substantially constant rate of introduction for each said constituent, subjecting the resulting mixture to a polymerizing reaction in said vessel, with constant agitation such as to produce and maintain a substantially homogeneous admixture of reacted and unreacted material throughout said reaction vessel, while continuously withdrawing said substantially homogeneous admixture of material from said vessel at substantially the same rate said raw materials in aggregate are introduced therein, so adjusting said rate of introduction and withdrawal in relation to the volume of said vessel and the time required for polymerizing said raw materials therein, that the material withdrawn is reacted to a thermosetting state, and continuously adding to and admixing with the material withdrawn from said vessel, a liquid carrier therefor, and in a preselected ratio thereto.

5. A process for producing a thermosetting phenolic resin which comprises: introducing into a reaction vessel, raw materials consisting of a phenol, an aldehyde and a catalyst in relative proportions such as to produce said resin, and subjecting the same, with constant agitation, to a polymerizing reaction for a preselected interval therein, and thereafter continuously introducing said raw materials into said vessel, and at a substantially constant rate of introduction for each said constituent, while meantime continuing to subject said mixture to said polymerizing reaction, with constant agitation such as to produce and maintain a substantially homogeneous admixture of reacted and unreacted material throughout said vessel, while continuously withdrawing said substantially homogeneous admixture of said material from said vessel at substantially the same rate said raw materials in aggregate are being introduced therein, and so adjusting said rate of introduction and withdrawal in relation to the volume of said vessel and the time required for polymerizing said raw materials therein, that the material withdrawn is reacted to a thermosetting state.

References Cited in the file of this patent

UNITED STATES PATENTS

| Number | Name | Date |
|---|---|---|
| 1,660,403 | Turkington | Feb. 28, 1928 |
| 1,895,945 | Semon | Jan. 31, 1933 |
| 2,075,429 | Douglas | Mar. 30, 1937 |
| 2,391,393 | Coffman | Dec. 25, 1945 |
| 2,456,192 | Houlton | Dec. 14, 1948 |
| 2,496,222 | Kolvoort | Jan. 31, 1950 |
| 2,537,031 | Chaney | Jan. 9, 1951 |
| 2,570,027 | Dunlop | Oct. 7, 1951 |

OTHER REFERENCES

Robitschek: Phenolic Resins, pages 76–77, Iliffe and Sons, Ltd., London, England (1950).

D'Alelio: Experimental Plastics and Synthetic Resins, pages 8, 9, 16–19, John Wiley and Sons, New York (1946).